(12) United States Patent
Nakamoto et al.

(10) Patent No.: US 8,385,095 B2
(45) Date of Patent: Feb. 26, 2013

(54) ELECTRIC POWER SUPPLY CIRCUIT AND PAM CONTROL METHOD FOR THE SAME

(75) Inventors: Ryou Nakamoto, Osaka (JP); Masafumi Hashimoto, Osaka (JP); Keisuke Shimatani, Osaka (JP); Keiichi Yoshisaka, Osaka (JP); Masakazu Katou, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 721 days.

(21) Appl. No.: 12/593,809

(22) PCT Filed: Mar. 31, 2008

(86) PCT No.: PCT/JP2008/000832
§ 371 (c)(1),
(2), (4) Date: Sep. 29, 2009

(87) PCT Pub. No.: WO2008/126388
PCT Pub. Date: Oct. 23, 2008

(65) Prior Publication Data
US 2010/0073977 A1    Mar. 25, 2010

(30) Foreign Application Priority Data

Mar. 30, 2007   (JP) ................................ 2007-093584

(51) Int. Cl.
*H02M 7/00* (2006.01)
*H02M 1/12* (2006.01)

(52) U.S. Cl. ............................. 363/125; 363/44; 363/82

(58) Field of Classification Search .............. 363/44–48, 363/82, 125, 126
See application file for complete search history.

(56) References Cited

U.S. PATENT DOCUMENTS

| 5,627,742 | A | 5/1997 | Nakata et al. | |
|---|---|---|---|---|
| 6,137,700 | A * | 10/2000 | Iida et al. | 363/89 |
| 8,102,686 | B2 * | 1/2012 | Katou et al. | 363/61 |
| 2011/0019452 | A1 * | 1/2011 | Shinomoto et al. | 363/126 |
| 2011/0085361 | A1 * | 4/2011 | Sakakibara | 363/126 |
| 2011/0101898 | A1 * | 5/2011 | Shinomoto et al. | 318/400.3 |

FOREIGN PATENT DOCUMENTS

| JP | 2000-166241 A | 6/2000 |
|---|---|---|
| JP | 2001-145358 A | 5/2001 |
| JP | 2003-174779 A | 6/2003 |

* cited by examiner

*Primary Examiner* — Jessica Han
(74) *Attorney, Agent, or Firm* — Birch, Stewart, Kolasch & Birch, LLP

(57) ABSTRACT

An increase in a ripple voltage of a capacitor in a smoothing circuit is prevented to achieve a compact capacitor and cost reduction for capacitors in an electric power supply circuit which performs PAM control using a switching element. An electric power supply circuit includes a bridge circuit for rectifying alternating current power, a smoothing circuit which has two capacitors serially connected to each other, and a PAM control section for turning a switching element on and off at a predetermined timing. The PAM control section includes a phase difference detection section which detects a phase shift of a PAM waveform based on a change in a voltage difference between the two capacitors, and a phase correction section which corrects the phase of the PAM waveform so that an input current has a sine waveform.

7 Claims, 13 Drawing Sheets

ELECTRIC POWER SUPPLY CIRCUIT AND PAM CONTROL METHOD FOR THE SAME

TECHNICAL FIELD

The present invention relates to an electric power supply circuit for converting alternating current power to direct current power, and particularly relates to prevention of an increase in ripple voltage of a capacitor.

BACKGROUND ART

Power supply devices (electric power supply circuits) for converting alternating current power to direct current power using a rectifier circuit have been conventionally known. A power supply device of this type includes a plurality of capacitors and reactors within the circuit, and therefore, harmonics tend to be generated, which results in reduction in power supply efficiency. To prevent such the reduction in power supply efficiency, a power supply device in which harmonics are reduced by so-called PAM (pulse amplitude modulation) control is known as disclosed in Patent Document 1.

Specifically, the power supply device disclosed in Patent Document 1 includes a rectifier circuit, which is an arrangement of diodes in a bridge configuration, and a smoothing circuit having a plurality of capacitors. More specifically, the smoothing circuit is composed of two capacitors connected in series to each other, and a single smoothing capacitor connected in parallel to the two capacitors, and is configured to perform double voltage rectification between the smoothing circuit and the rectifier circuit. Further, the power supply apparatus includes a switching element, provided between an output terminal of the bridge rectifier circuit and the power supply, for short-circuiting output power of the rectifier circuit when turned on.

In the power supply device, the switching element is switched at predetermined timing according to a zero-cross point of an input voltage so that, in the rectifier circuit, a waveform of the input current approximates to a waveform (i.e., a sine wave) of an input voltage. Specifically, the power supply device is configured such that the on duty of the output waveform by the PAM control is controlled by this switching operation, and thereby, the waveform of the input current approximates to the sine wave. By this PAM control, harmonic currents generated in the power supply device are reduced.

CITATION LIST

Non-Patent Document

NON-PATENT DOCUMENT 1: Japanese Laid-Open Patent Application Publication No. 2001-145358

SUMMARY OF THE INVENTION

Technical Problem

According to Patent Document 1, the on duty of the output waveform by the PAM control is controlled. However, it may also be possible that the on and off intervals of the output waveform by the PAM control are kept constant to control the phase of the output waveform by the PAM control, thereby approximating the waveform of the input current to a sine wave. In such a case, the timing at which a pulse signal for the PAM control is output is determined according to the zero-cross points of the input voltage so that the waveform of the input current approximates to a sine wave.

However, if the waveform of the input voltage is distorted due to such as a disturbance, the output timing of the pulse signal for the PAM control may be shifted from a desired timing that can make the waveform of the input current approximate to a sine wave.

If this is the case, a timing at which the switching element is switched is shifted from a predetermined timing for the input voltage, and as a result, the amount of charge in the serially-connected capacitors within the smoothing circuit may be unbalanced and a ripple voltage of the capacitors may increase. If the ripple voltage of the capacitors increases, it is necessary to increase the capacities of the capacitors and increase the breakdown voltage of the capacitors in order to prevent the ripple voltage from exceeding a surge voltage which the capacitors can withstand.

The present invention was made in view of the above, and is advantageous in preventing an increase in a ripple voltage of a capacitor within a smoothing circuit, and thereby achieving a compact capacitor and reducing costs for capacitors, in an electric power supply circuit which performs PAM control using a switching element for short-circuiting output power of a rectifier circuit.

Solution to the Problem

To realize the above, an electric power supply circuit (10) of the present invention is configured to change a timing at which a pulse signal is output to a switching element (S), which is for short-circuiting output power of a rectifier circuit (12), based on an amount of charge in the two capacitors (C1 and C2) serially connected to each other in a smoothing circuit (13) connected to an output side of the rectifier circuit (12).

Specifically, the first aspect of the present invention is an electric power supply circuit including: a rectifier circuit (12) which is connected to an alternating current power source (20) and which rectifies alternating current power; a smoothing circuit (13) which has two capacitors (C1 and C2) serially connected to each other and which is connected to an output side of the rectifier circuit (12); a switching element (S) which, when turned into an ON state, connects the alternating current power source (20) and a midpoint between the two capacitors (C1 and C2) and which causes a short circuit of an output power of the rectifier circuit (12); and a PAM control section (15) which outputs a pulse signal for switching the switching element (S), at a predetermined timing based on a zero-cross point of an input voltage of the rectifier circuit (12).

The PAM control section (15) includes a phase difference detection section (15d) which detects, based on an amount of charge in the two capacitors (C1 and C2), a shift between an output phase of the pulse signal and a phase of a pulse signal that makes an input current of the rectifier circuit (12) have a sine waveform, and a phase correction section (15e) which corrects the output phase of the pulse signal so that the phase shift detected by the phase difference detection section (15d) is removed.

Due to this configuration, a timing at which the switching element (S) is switched on/off can be changed by the PAM control section (15) based on the amount of charge in the two capacitors (C1 and C2) serially connected to each other in the smoothing circuit (13) located at an output side of the rectifier circuit (12). Here, the amount of charge in the two capacitors (C1 and C2) varies according to the switching timing of the switching element (S). Thus, imbalance of the amount of charge between the capacitors (C1 and C2) can be avoided by controlling the switching timing of the switching element (S) based on the amount of charge in the capacitors (C1 and C2) as in the above configuration.

Accordingly, even in the case where the output timing of the pulse signal for switching on/off the switching element (S) is shifted from a desired timing which makes the input current have a sine waveform with respect to a zero-cross point of the input voltage, the timing can be changed such that the pulse signal can be output at the desired timing from the zero-cross point of the input voltage, according to the above configuration. Thus, imbalance of the amount of charge between the capacitors (C1 and C2) can be reduced.

It is thus possible to avoid an increase in a ripple voltage of the capacitors due to the shift of the output timing of the pulse signal as described in the above. This eliminates the necessity of increasing the capacities of the capacitors and increasing the breakdown voltage of the capacitors and, consequently, it is possible to achieve compact capacitors and reduce costs for capacitors.

In the above configuration, the phase difference detection section (15d) is configured to detect the shift between the output phase of the pulse signal and the phase of the pulse signal that makes the input current of the rectifier circuit (12) have a sine waveform, based on a voltage difference between the two capacitors (C1 and C2) (the second aspect of the present invention).

According to this aspect of the present invention, the timing at which the pulse signal is output to the switching element (S) can be changed by only using a voltage difference between the two capacitors (C1 and C2) in the smoothing circuit (13). Thus, imbalance of the amount of charge between the capacitors (C1 and C2) can be avoided by a simple configuration and calculation.

Further, it is preferable that the phase difference detection section (15d) is configured to detect the shift between the output phase of the pulse signal and the phase of the pulse signal that makes the input current of the rectifier circuit (12) have a sine waveform, based on a change in the voltage difference between the two capacitors (C1 and C2), the change in the voltage difference between the two capacitors (C1 and C2) being obtained by comparing voltage differences during periods in which the switching element (S) is in an OFF state for more than a certain period of time in one cycle of the input voltage (the third aspect of the present invention).

Here, the certain period of time is a period of time in which no PAM control is performed with respect to the waveform of the input voltage, and refers to a period of time in which the capacitors (C1 and C2) are charged.

According to this aspect of the present invention, a change in the voltage difference between the two capacitors (C1 and C2) can be obtained by comparing voltage differences during periods in which the switching element (S) is in the OFF state for more than a certain period of time, that is, voltage differences at portions in which there is almost no change in the voltage difference between the two capacitors (C1 and C2). Thus, the shift of the output phase of the pulse signal can be detected by a simpler configuration and calculation.

Further, the phase difference detection section (15d) may be configured to detect the shift between the output phase of the pulse signal and the phase of the pulse signal that makes the input current of the rectifier circuit (12) have a sine waveform, based on a voltage change of one of the two capacitors (C1 and C2) (the fourth aspect of the present invention).

According to this aspect of the present invention, it is possible to detect an imbalance of the amount of charge between the capacitors (C1 and C2) in the smoothing circuit (13) and correct the output phase of the pulse signal at an appropriate timing, by detecting a voltage change of only one of the two capacitors. Thus, the configuration for detecting the phase shift can be simplified.

Further, it is preferable that the phase correction section (15e) is configured to correct the output phase of the pulse signal in stages according to the amount of charge in the two capacitors (C1 and C2) (the fifth aspect of the present invention).

According to this aspect of the present invention, the output timing of the pulse signal can be accurately changed to an appropriate timing, according to the amount of charge in the capacitors (C1 and C2). Thus, an imbalance of the amount of charge between the capacitors (C1 and C2) can be reliably avoided.

Further, the PAM control section (15) further includes a zero-cross detection section (15a) which detects that the input voltage of the rectifier circuit (12) has increased to be equal to or higher than a predetermined value and is approaching the zero-cross point, and a PAM waveform output section (15b) which outputs an ON pulse to the switching element (S) when the zero-cross detection section (15a) detects that the input voltage of the rectifier circuit (12) has increased to be equal to or higher than a predetermined value and is approaching the zero-cross point (the sixth aspect of the present invention).

According to this aspect of the present invention, the switching element (S) can always be turned into the ON state on a trailing edge of the zero-cross signal by the PAM waveform output section (15b), and it is thus possible to charge the capacitors (C1 and C2) until an OFF pulse is output next, in the configuration in which a trailing edge of the zero-cross signal is detected by the zero-cross detection section (15a) detecting that the input voltage has increased to be equal to or higher than a predetermined value and in which when the trailing edge of the zero-cross signal is detected, the switching state at the detection is maintained. In other words, in the above configuration, if the switching element (S) is in the OFF state when the trailing edge of the zero-cross signal is detected, the capacitors (C1 and C2) are not charged for a relatively long period of time until an OFF pulse is output next. However, as mentioned in the above, by outputting an ON pulse at a time of detection of the trailing edge of the zero-cross signal, the capacitors (C1 and C2) can be reliably charged from after this detection until the output of the first OFF pulse.

Particularly in the double voltage rectifier circuit using a switching element (S) such as described in the above, the voltage of one of the two serially-connected capacitors (C1 and C2), that is, the voltage of the capacitor (C2), decreases to result in excess charge in the capacitor (C2) if there is a period of time in which the capacitors (C1 and C2) are not charged because of the OFF state of the switching element (S). However, by forcibly turning the switching element (S) into the ON state at the detection of the trailing edge of the zero-cross signal to allow the capacitors (C1 and C2) to be charged as described in the above, generation of an excess voltage in the capacitor C2 due to the excess charge in the capacitor (C2) can be prevented.

The seventh aspect of the present invention is a PAM control method for an electric power supply circuit having a configuration as described in the above. Specifically, the seventh aspect of the present invention is a PAM control method for an electric power supply circuit including: a rectifier circuit (12) which is connected to an alternating current power source (20) and which rectifies alternating current power; a smoothing circuit (13) which is connected to an output side of the rectifier circuit (12) and which has two capacitors (C1 and C2) serially connected to each other, a switching element (S) which, when turned into an ON state, connects the alternating current power source (20) and a midpoint between the two capacitors (C1 and C2) and which causes a short circuit of an output power of the rectifier circuit (12); and a PAM control section (15) which outputs a pulse signal for switching the switching element (S) at a predetermined timing based on a zero-cross point of an input voltage of the rectifier circuit (12).

The PAM control section (15) detects a voltage difference between the two capacitors (C1 and C2), and corrects an output phase of the pulse signal in stages according to the voltage difference between the two capacitors (C1 and C2) so that the output phase of the pulse signal is a predetermined phase that makes an input current of the rectifier circuit (12) have a sine waveform.

By this method, a shift in the timing at which the pulse signal is output to the switching element (S) can be detected from a voltage difference between the two capacitors (C1 and C2) constituting the smoothing circuit (13), that is, a difference between the amount of charge in the capacitor (C1) and the amount of charge in the capacitor (C2), and the output timing of the pulse signal can be changed according to this shift. It is thus possible to reduce an imbalance of the amount of charge between the capacitors (C1 and C2), and as a result, an increase in a ripple voltage is prevented.

Moreover, as described in the above, by using a voltage difference between the two capacitors (C1 and C2), a difference in the amount of charge between the capacitors (C1 and C2) can be detected by a simple configuration and calculation.

Advantages of the Invention

According to the electric power supply circuit (10) of the first aspect of the present invention, the PAM control section (15) which outputs a pulse signal to the switching element (S) at a predetermined timing includes a phase difference detection section (15d) which detects a shift of the output phase of the pulse signal based on an amount of charge in the two capacitors (C1 and C2) in the smoothing circuit (13), and a phase correction section (15e) which corrects the output phase of the pulse signal to remove the phase shift. Thus, even if the waveform of the input voltage is distorted, the output timing of the pulse signal to the switching element (S) can be accordingly changed, and as a result, an imbalance of the amount of charge between the two capacitors (C1 and C2) can be avoided. This can prevent an increase in a ripple voltage of the capacitors (C1 and C2) and eliminate the need to increase capacities of the capacitors (C1 and C2) and the need to increase the breakdown voltage of the capacitors (C1 and C2). As a result, compact capacitors (C1 and C2) are possible and costs for capacitors can be reduced.

According to the second aspect of the present invention, the phase difference detection section (15d) is configured to detect a shift of the output phase of the pulse signal based on the voltage difference between the two capacitors (C1 and C2). Thus, the shift of the output phase of the pulse signal can be detected by a simple configuration and calculation, i.e., by obtaining a voltage difference between the two capacitors (C1 and C2).

According to the third aspect of the present invention, the phase difference detection section (15d) is configured to detect a shift of the output phase of the pulse signal based on a change in the voltage difference between the two capacitors (C1 and C2) which is obtained by comparing voltage differences between the two capacitors (C1 and C2) during periods in which the switching element (S) is in the OFF state for more than a certain period of time. Thus, the shift of the output phase of the pulse signal can be accurately detected by a simple calculation comparing the portions at which there is almost no voltage difference (the portions at which the voltage difference does not change much with time).

According to the fourth aspect of the present invention, the phase difference detection section (15d) is configured to detect the shift of the output phase of the pulse signal based on a voltage change of one of the two capacitors (C1 and C2). This eliminates the need to detect the voltages of both capacitors (C1 and C2), and thus, the configuration for detecting the shift of the output phase of the pulse signal can be simplified.

According to the fifth aspect of the present invention, the phase correction section (15e) is configured to correct the output phase of the pulse signal in stages according to the amount of charge in the two capacitors (C1 and C2). Thus, the output phase of the pulse signal can be accurately corrected according to the amount of charge in the capacitors (C1 and C2), and as a result, an increase in a ripple voltage of the capacitors (C1 and C2) can be prevented more reliably.

According to the sixth aspect of the present invention, the PAM control section (15) includes a zero-cross detection section (15a) which detects that the input voltage has increased to be equal to or higher than a predetermined value, and a PAM waveform output section (15b) which outputs an ON pulse to the switching element (S) when the zero-cross detection section (15a) detects that the input voltage has increased to be equal to or higher than a predetermined value. It is therefore possible to ensure a period of time in which the capacitors (C1 and C2) are charged after a trailing edge of the zero-cross signal, and possible to prevent one of the two capacitors (C1 and C2), that is, the capacitor (C2), from being excessively charged and resulting in an excess voltage in the capacitor (C2). This eliminates the need for the capacitors (C1 and C2) to withstand a high surge voltage in consideration of the excess voltage, and as a result, compact capacitors (C1 and C2) are possible and costs for capacitors can be reduced.

According to the PAM control method for an electric power supply circuit of the seventh aspect of the present invention, a voltage difference between the two capacitors (C1 and C2) in the smoothing circuit (13) is detected, and the output phase of the pulse signal is corrected according to the voltage difference so that the output timing of the pulse signal to the switching element (S) is a predetermined timing that makes the input current have a sine waveform. Thus, the output timing of the pulse signal can be accurately corrected according to the amount of charge in the capacitors (C1 and C2). This can prevent an imbalance of the amount of charge between the capacitors (C1 and C2), and therefore can prevent an increase in a ripple voltage of the capacitors (C1 and C2). Consequently, there is no need to increase capacities of the capacitors (C1 and C2) and increase breakdown voltage, and thus, compact capacitors (C1 and C2) are possible and costs for capacitors can be reduced. Moreover, by detecting an imbalance of the amount of charge between the capacitors (C1 and C2) using a voltage difference between the capacitors (C1 and C2) as described in the above, a shift of the output phase of the pulse signal can be detected by a simple configuration and calculation.

DESCRIPTION OF REFERENCE CHARACTERS

Figure 1:
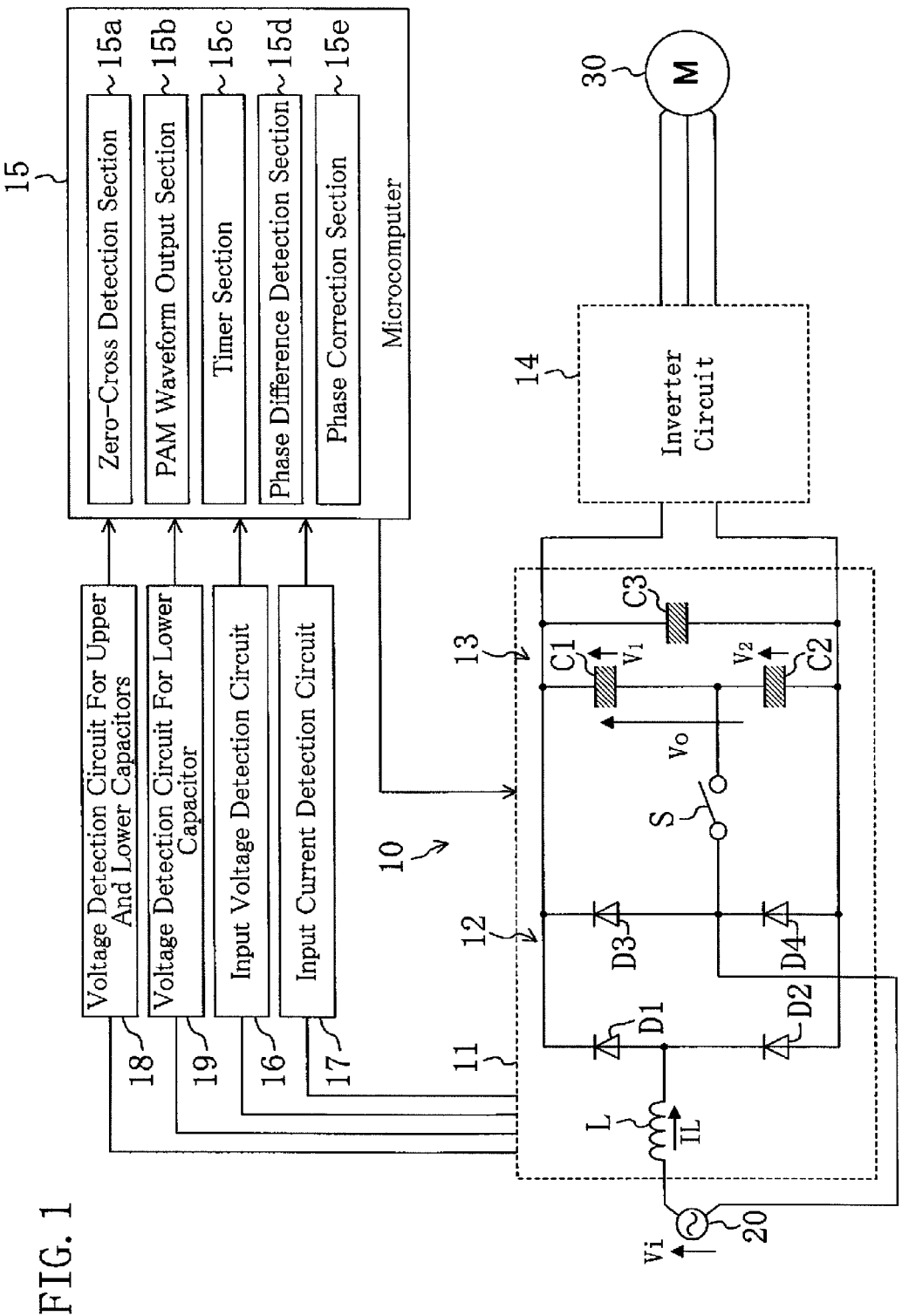
FIG. 1 is a circuit diagram illustrating the entire configuration of an electric power supply circuit according to an embodiment.

10 Electric power supply circuit
12 Bridge circuit (rectifier circuit)
13 Smoothing circuit
15 Microcomputer (PAM control section)
15a Zero-cross detection section
15b PAM waveform output section
15c Timer section
15d Phase difference detection section
15e Phase correction section
20 Alternating current power source
S Switching element
D1 to D4 Diodes
C1 and C2 Capacitors

DESCRIPTION OF EMBODIMENTS

Embodiments of the present invention will be described in detail referring to the drawings. The description of the following preferable embodiments is merely illustrative, and is not intended to limit the scope of the present invention, its application, or its range of use.

(Entire Configuration)

As shown in FIG. 1, an electric power supply circuit (10) according to this embodiment includes a converter circuit (11), an inverter circuit (14) and a microcomputer (15). Specifically, the electric power supply circuit (10) is configured such that the converter circuit (11) rectifies alternating current power, and the rectified alternating current power is converted to a three-phase alternating current power by the inverter circuit (14) to be supplied to an electric motor drive (30).

The electric motor drive (30) is used to energize an compressor provided, for example, in a refrigerant circuit in an air conditioning system. Although not shown in the drawings, the refrigerant circuit of the air conditioning system is configured such that the compressor, a condenser, an expansion mechanism and an evaporator are connected to form a closed circuit, in which a refrigerant circulates to perform a vapor compression refrigeration cycle. Owing to the refrigerant circuit, the air cooled by the evaporator is supplied into a room in a cooling operation, and the air heated by the condenser is supplied in a room in a heating operation.

The converter circuit (11) is connected to an alternating current power source (20) to rectify alternating current power. The converter circuit (11) includes a bridge circuit (12) connected to the alternating current power source (20) via a reactor (L), and a smoothing circuit (13) connected to an output side of the bridge circuit (12).

The bridge circuit (12) is a diode bridge circuit which is connected to the alternating current power source (20) and in which four diodes (D1 through D4) are connected in a bridge configuration. In other words, the bridge circuit (12) serves as a rectifier circuit of the present invention.

The smoothing circuit (13) is provided at an output side of the bridge circuit (12). The smoothing circuit (13) includes two capacitors (C1 and C2) connected in series with each other, and a capacitor (C3) connected in parallel to the two capacitors (C1 and C2). The serially connected two capacitors (C1 and C2) charge/discharge an output voltage of the bridge circuit (12). The two capacitors (C1 and C2) are called an upper capacitor (C1) and a lower capacitor (C2) in order from the output terminal side of the bridge circuit (12) (in order from the upper side of the drawing), and these two capacitors divide the voltage Vo, thereby enabling the current IL to flow even if the voltage Vi is low. The capacitor (C3) connected in parallel to the two capacitors (C1 and C2) smoothes the output voltage ($V_o$) of the two capacitors (C1 and C2). In the smoothing circuit (13), the alternating current power source (20) and a midpoint between the two capacitors (C1 and C2) are connected to each other as shown in the drawing, thereby enabling double-voltage rectification between the smoothing circuit (13) and the bridge circuit (12).

The converter circuit (11) includes a switching element (S) capable of bidirectional conduction by being turned ON and OFF. The switching element (S) is provided between an input terminal of the bridge circuit (12) and the midpoint between the two capacitors (C1 and C2) connected in series with each other. That is, the converter circuit (11) of this embodiment is switched to serve as a double voltage rectifier circuit when the switching element (S) is turned ON, and is switched to serve as a full-wave rectifier circuit when the switching element (S) is turned OFF.

The inverter circuit (14) is configured to convert a direct current power of the capacitors (C1 and C2) to a three-phase alternating current power, and supply the three-phase alternating current power to the electric motor drive (30). Although not shown in the drawings, the inverter circuit (14) has a general configuration in which, for example, six switching elements are connected with one another in a three-phase bridge configuration.

The microcomputer (15) performs, in addition to switching control of the inverter circuit (14), PAM (pulse amplitude modulation) control of the converter circuit (11), and serves as a PAM control section of the present invention. The microcomputer (15) includes a zero-cross detection section (15a), a PAM waveform output section (15b) and a timer section (15c).

The electric power supply circuit (10) includes an input voltage detection circuit (16) for detecting the input voltage (Vi) of the bridge circuit (12), and an input current detection circuit (17) for detecting the input current (IL).

Figure 2:
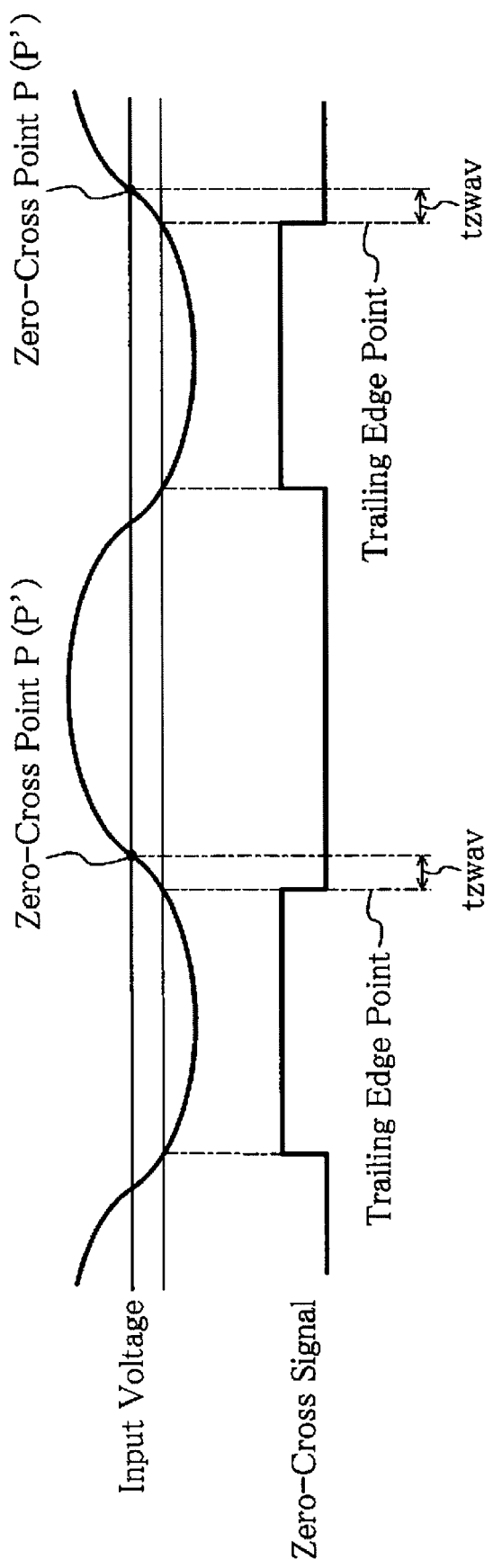
FIG. 2 is a waveform diagram illustrating the relationship between an input voltage and a zero-cross signal.

As shown in FIG. 2, the zero-cross detection section (15a) is configured to output a zero-cross signal according to the input voltage (Vi) detected by the input voltage detection circuit (16). Specifically, the zero-cross detection section (15a) outputs an ON signal if the input voltage (Vi) is lower than a predetermined value, and is turned OFF if the input voltage (Vi) is equal to or higher than the predetermined value. In other words, by detecting a trailing edge point of the ON signal (hereinafter simply referred to as a "trailing edge point"), it is detected that the input voltage (Vi) has increased to be equal to or higher than the predetermined value and is approaching a zero-cross point P (see FIG. 2 and FIG. 3). Here, there is a certain time lag (tzwav) between this trailing edge point and the zero-cross point P' (in the examples shown in FIG. 2 and FIG. 3, the zero-cross point P' is the same as the actual zero-cross point P) detected by the microcomputer (15) based on the detection result of the zero-cross detection section (15a).

Figure 3:
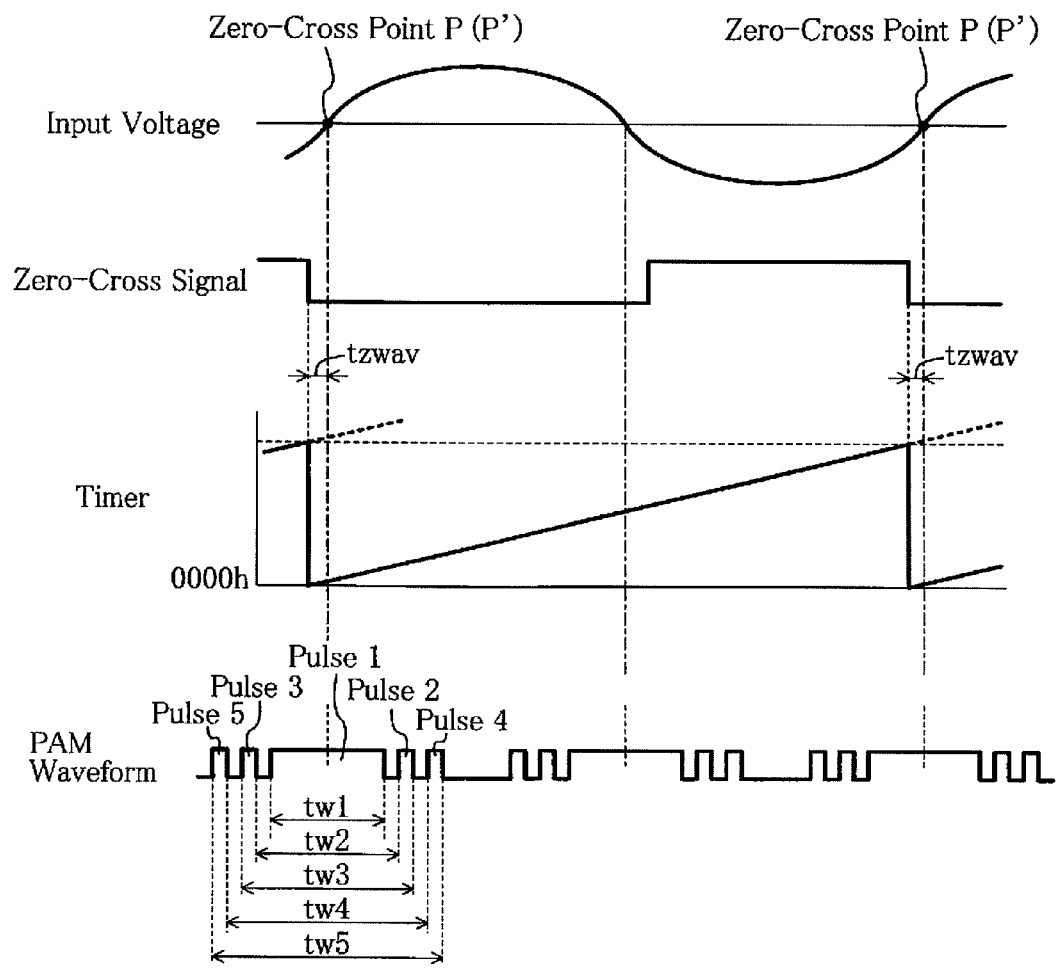
FIG. 3 is a waveform diagram illustrating an output state of a PAM waveform.

As shown in FIG. 3, the timer section (15c) starts counting when a trailing edge point is detected by the zero-cross detection section (15a). When a subsequent trailing edge point is detected by the zero-cross detection section (15a), the timer section (15c) is reset and starts new counting. Thus, the timer section (15c) is reset and starts new counting each time the zero-cross detection section (15a) detects a trailing edge point.

As shown in FIG. 3, the PAM waveform output section (15b) outputs a pulse signal (ON and OFF pulses) for switching the switching element (S). The PAM waveform output section (15b) outputs the pulse signal so that the input current (IL) has a same (or similar) sine waveform which the input voltage (Vi) has. Specifically, the PAM waveform output section (15b) outputs the pulse signal at a predetermined timing (output timing), using the count of the timer section (15c), each time a trailing edge point is detected by the zero-cross detection section (15a). In other words, the pulse signal is output at a predetermined timing based on the zero-cross point P', which is detected by the microcomputer (15) based on the detection result by the zero-cross detection section (15a) (i.e., a first zero-cross point after a trailing edge point detected by the zero-cross detection section (15a)).

As shown in FIG. 3, the PAM waveform output section (15b) outputs the pulse signals so that a pulse group consisting of five pulses is generated for each zero-cross point. The pulse group is generated so that a center pulse 1 (ON pulse) has a larger width than widths of the other four pulses 2 through 5, and has a symmetrical pattern with respect to the center pulse 1. In the pulse group, dimensions tw1 through tw5 are fixed as shown in FIG. 3. In other words, according to the present embodiment, the pulse width of the pulse group is fixed.

The PAM waveform output section (15b) outputs the pulse signal so that the center pulse 1 is generated to extend over the zero-cross point P at any time. The output timing for the pulse signal is set so that, when a trailing edge point is detected, the PAM waveform output section (15b) outputs an OFF pulse at a predetermined timing, and thereafter, alternately outputs ON and OFF pulses. Thus, according to the present embodiment, so-called multi-pulse control is performed in which a plurality of pulses (ON pulses) are generated during a half cycle of the input voltage (Vi).

Further, the PAM waveform output section (15b) is configured to output an ON pulse when a trailing edge of the zero-cross signal is detected by the zero-cross detection section (15a). Thus, as described in detail later, even when the zero-cross signal is considerably shifted due to distortion of the waveform of the input voltage, the switching element (S) can be always in the ON state on a trailing edge of the zero-cross signal. At the same time, the ON state is kept until the first OFF pulse is output from the PAM waveform output section (15b) as described in the above, and therefore, the capacitors (C1 and C2) are intermittently charged during that time.

Furthermore, the PAM waveform output section (15b) is configured such that the output timing which has been set is adjusted by the amount corresponding to the phase shift, in order that the phase of the PAM waveform is shifted, based on a zero-cross point P of the input voltage (Vi), from the phase of the PAM waveform which makes the input current (IL) has a sine waveform. Specifically, in FIG. 3, to shift the phase of the PAM waveform to the right, the output timing is adjusted to be delayed by the amount corresponding to the phase shift, and to shift the phase of the waveform to the left, the output timing is corrected to be advanced by the amount corresponding to the phase shift.

Next, a basic output operation for the PAM waveform will be described in detail with reference to FIG. 3 through FIG. 6.

Figure 4:
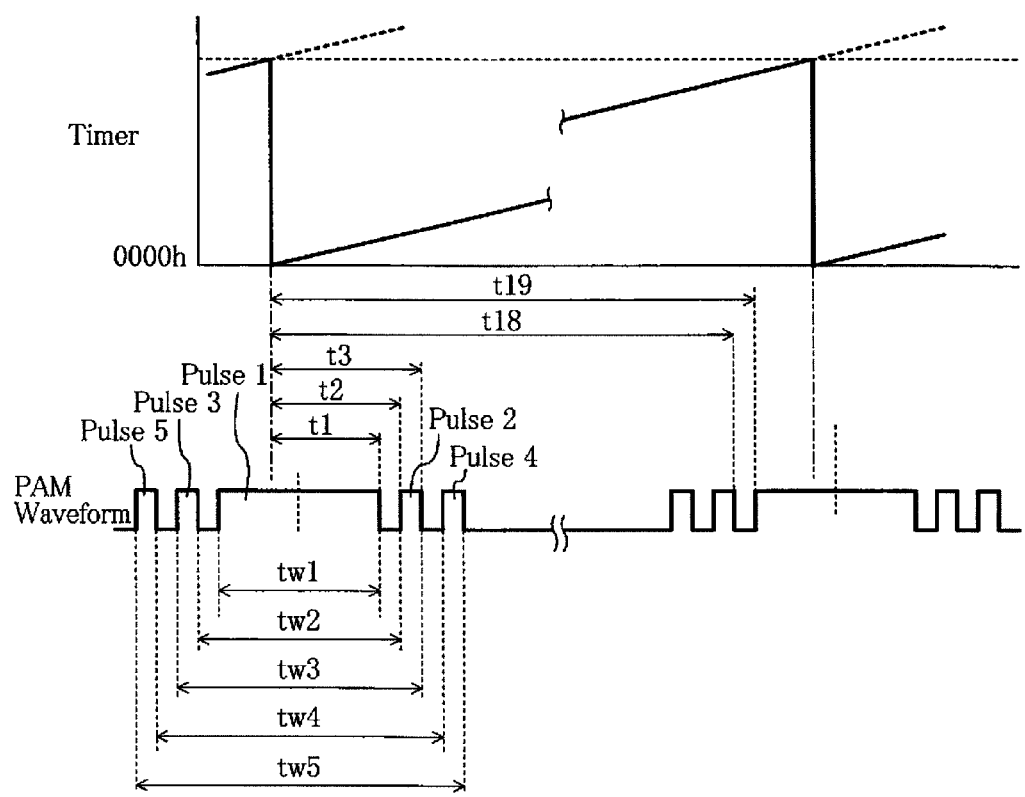
FIG. 4 is a waveform diagram for explaining an output timing of the PAM waveform.

As shown in FIG. 3, the timer section (15c) starts counting when a trailing edge point of a zero-cross signal is detected by the zero-cross detection section (15a). Then, the PAM waveform output section (15b) outputs a pulse signal at a predetermined timing. Specifically, as shown in FIG. 4, when the count of the timer section (15c) is "t1," an OFF pulse is output first. Subsequently, each time the count of the timer section (15c) becomes "t2," "t3," . . . , "t18" or "t19," ON and OFF pulses of the pulse signal are alternately output. The PAM waveform corresponding to one cycle of an input voltage is output in this manner. A time (an estimated time) from the trailing edge point to a zero-cross point P is considered when determining the count values "t2," "t3," . . . , "t18" or "t19" so that the PAM waveform is output at a predetermined timing from the zero-cross point.

When a subsequent trailing edge point of the zero-cross signal is detected, the timer section (15c) is reset and starts new counting. Thus, the pulse signals are alternately output at the same timing as the timing described in the above. In this case, since an ON pulse is generated so as to extend over the zero-cross point P, it is ensured that the next pulse is always an OFF pulse as configured. As a result, a desired PAM waveform can be reliably generated.

Further, as described later, when a trailing edge is detected by the zero-cross detection section (15a), an ON pulse is forcibly output from the PAM waveform output section (15b) even when the zero-cross signal is considerably shifted due to distortion of the waveform of the input voltage. Thus, the switching element (S) is always in the ON state on a trailing edge of the zero-cross signal, and because this ON state is maintained until the output of the first OFF pulse, the output timing of the ON and OFF pulses can be determined based on the count of the timer section (15c) as in the case of the ON pulse generated so as to extend over the zero-cross point as described in the above, and as a result, a desired PAM waveform can be reliably generated.

In the present embodiment, when the waveform of the input current is distorted such as due to distortion of the input voltage, control is performed in which the phase of the PAM waveform is shifted to approximate the waveform of the input current to a sine wave. Here, the case where the phase of the PAM waveform is shifted to the right as viewed in FIG. 3 will be described.

Figure 5:
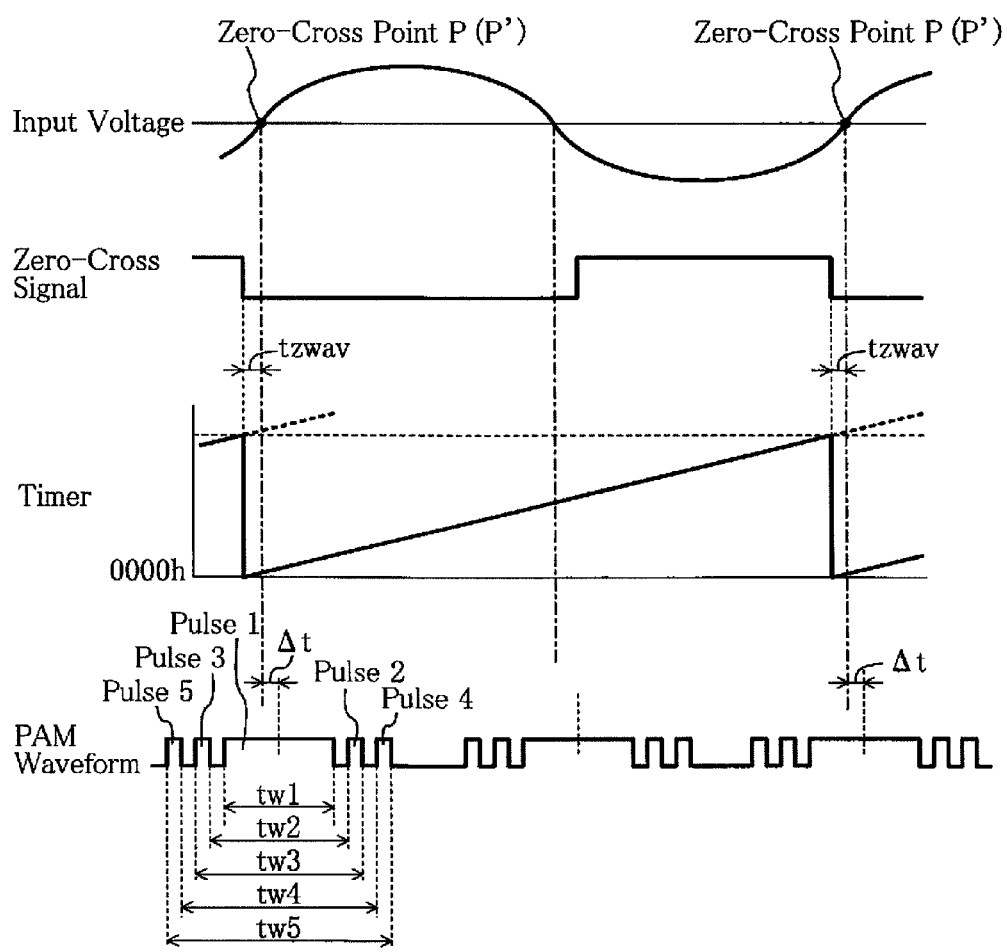
FIG. 5 is a waveform diagram illustrating an output state of the PAM waveform when the phase is shifted.

As shown in FIG. 5, to shift the phase of the PAM waveform to the right by $\Delta t$ (to delay by $\Delta t$) from the state shown in FIG. 3, the output timing set in the PAM waveform output section (15b) is adjusted. In other words, the output timing which has been initially set is adjusted to be delayed by Δt. Thus, when a trailing edge point of a zero-cross signal is detected and the timer section (15c) starts counting, the PAM waveform output section (15b) outputs a pulse signal at the adjusted timing.

Figure 6:
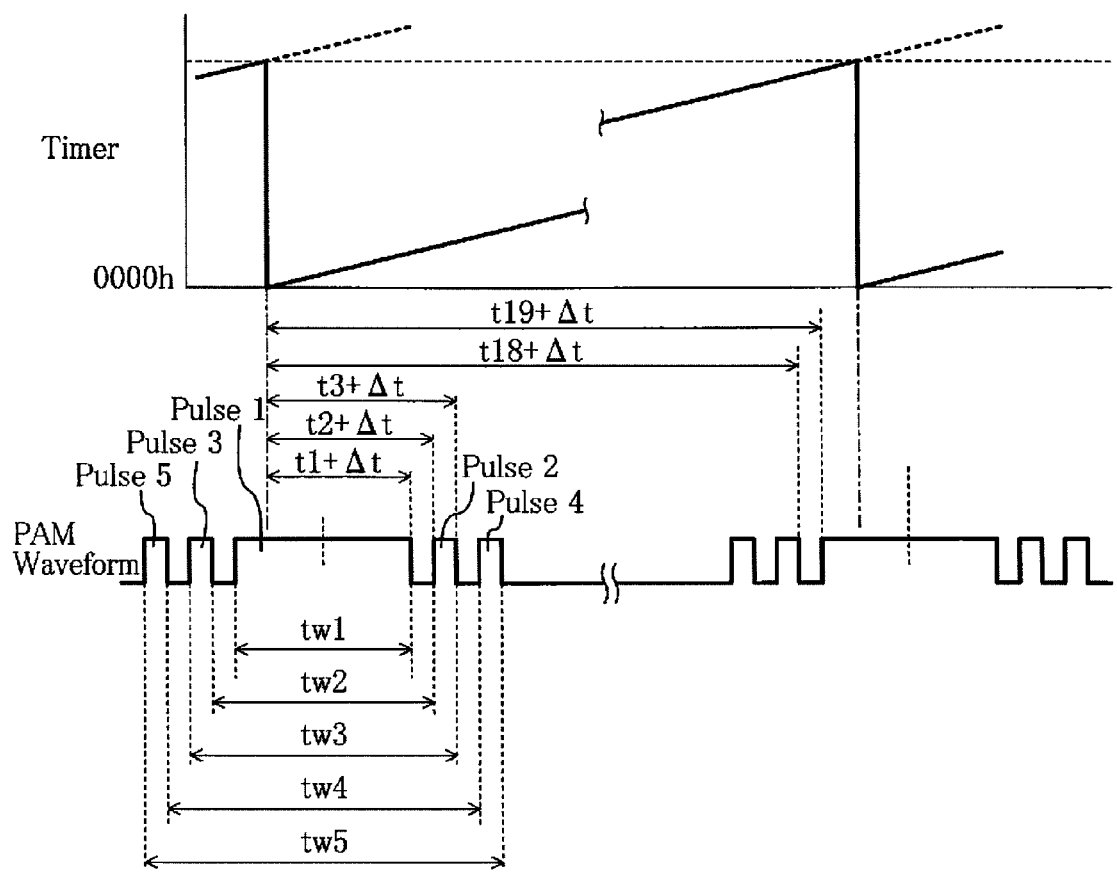
FIG. 6 is a waveform diagram for explaining an output timing of the PAM waveform when the phase is shifted.

Specifically, as shown in FIG. 6, an OFF pulse is first output when the count of the timer section (15c) becomes "t1+Δt." Subsequently, each time the count of the timer section (15c) becomes "t2+Δt," "t3+Δt," . . . , "t18+Δt" or "t19+Δt," pulse signals are alternately output. Thus, a PAM waveform can be generated without changing the pulse width of the pulse group and predetermined dimensions of tw1 through tw5.

Moreover, even when the phase of the PAM waveform is shifted as in the above, the pulse 1 (ON pulse) can be maintained to extend over the zero-cross point P. It is thus ensured that the next pulse is always an OFF pulse each time a trailing edge point is detected. As a result, a desired PAM waveform can be reliably generated.

In contrast to the above, in the case where the phase of the PAM waveform is shifted by Δt to the left in FIG. 3, an OFF pulse is output when the count of the timer section (15c) becomes "t1−Δt." Subsequently, each time the count becomes "t2−Δt," "t3−Δt," . . . , "t18−Δt" or "t19−Δt," pulse signals are alternately output. In this case as well, a PAM waveform can be generated without changing the pulse width of the pulse group and the predetermined dimensions of tw1 through tw5.

(Detection of Shift in the Output Phase of a Pulse Signal)

Next, a method is described for detecting a shift amount at a time in which the output phase of an actually-generated PAM waveform is shifted from a targeted PAM waveform (a PAM waveform which makes the input current have a sine waveform) based on an actual zero-cross point P of the input voltage (Vi).

Figure 7:
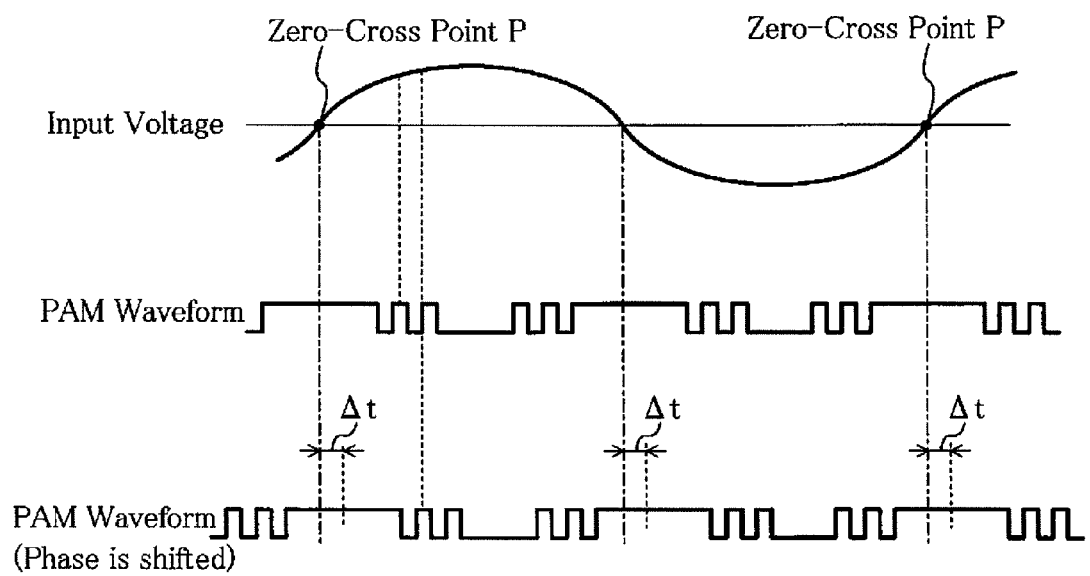
FIG. 7 is a waveform diagram illustrating the relationship between the PAM waveform and the input voltage when the phase is shifted.

In the electric power supply circuit (10) according to the present embodiment, when as shown in FIG. 7 the phase of the PAM waveform (below) is shifted from the targeted phase (above), an output timing of a pulse signal to the switching element (S) is shifted, resulting in an imbalance of the amount of charge between the two capacitors (C1 and C2) within the smoothing circuit (13). Specifically, for example, if the phase of the PAM waveform is delayed by Δt as shown in FIG. 7, ripple voltages of both the upper capacitor (C1) and the lower capacitor (C2) increase (see FIG. 8). Also, if the phase of the PAM waveform is shifted as shown in FIG. 7, a current (a PAM current) passing through the switching element (S) during PAM control is unbalanced in a half cycle of the input voltage, and as a result, a larger current passes through the switching element (S), compared to the case in FIG. 9 where the PAM current is not unbalanced (see FIG. 8).

Figure 8:
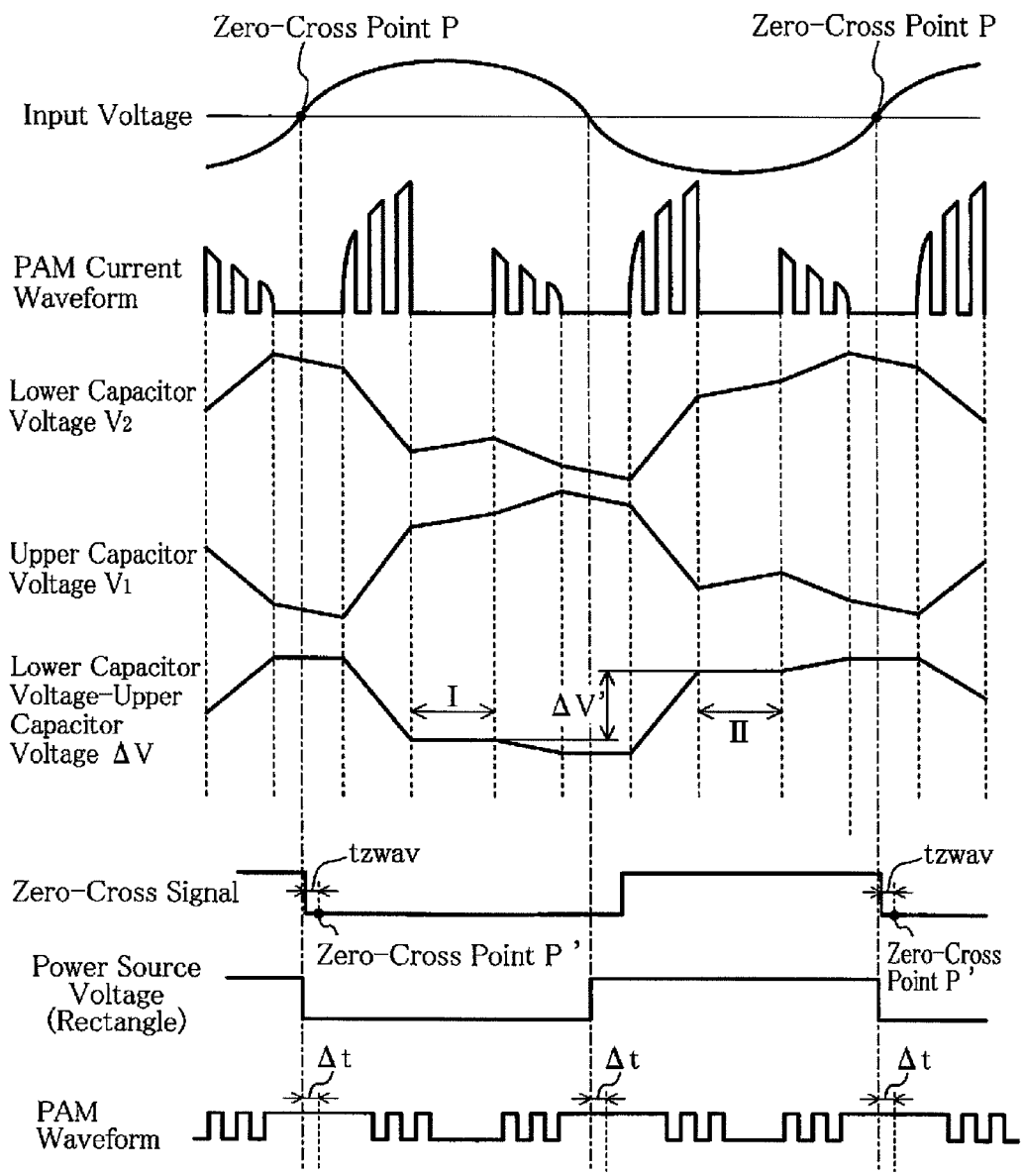
FIG. 8 is a waveform illustrating the relationship between a PAM current and voltages of upper and lower capacitors when the phase is shifted.

FIG. 8 shows the waveform of a PAM current, voltages of the upper and lower capacitors (C1 and C2), and a voltage difference between the upper and lower capacitors (C1 and C2) when the phase of the PAM waveform is delayed by Δt from the phase of a targeted PAM waveform. As illustrated in FIG. 8, if the phase of the PAM waveform is delayed from the targeted phase, the PAM current is unbalanced in a half cycle of the input voltage, and at the same time, the ripple voltages of the upper and lower capacitors (C1 and C2) increase. In such a case, it is necessary to increase the capacities of the capacitors (C1 and C2) and increase the breakdown voltage of the capacitors (C1 and C2) so that the capacitors can withstand the increased ripple voltages. FIG. 8 shows the case in which a zero-cross point P' detected by the microcomputer (15) is shifted to be delayed with respect to an actual zero-cross point P of the input voltage (Vi).

In this case, according to the present invention, the phase shift of the PAM waveform is detected based on the amount of charge in the upper and lower capacitors in the smoothing circuit (13), and the phase is corrected so as to remove the shift.

In other words, according to the present embodiment, to what extent and in which direction the phase of the PAM waveform is shifted (whether it is advanced or delayed) from the targeted PAM waveform (a PAM waveform with a predetermined phase that makes the input current have a sine waveform) with respect to an actual zero-cross point P, are determined according to the voltage difference between the upper and lower capacitors (C1 and C2), and based on this determination result, the phase of the PAM waveform is corrected.

Specifically, the electric power supply circuit (10) further includes a voltage detection circuit (18) for detecting a voltage of the upper and lower capacitors (C1 and C2) in the smoothing circuit (13), and a voltage detection circuit (19) for detecting a voltage of the lower capacitor (C2) (see FIG. 1).

The microcomputer (15) of the electric power supply circuit (10) further includes a phase difference detection section (15d) for detecting a phase shift of the PAM waveform based on a voltage difference between the upper and lower capacitors (C1 and C2), and a phase correction section (15e) for correcting the phase of the PAM waveform to remove the phase shift detected by the phase difference detection section (15d) (see FIG. 1).

The phase difference detection section (15d) is configured to calculate a voltage difference between the upper and lower capacitors (C1 and C2). Specifically, the voltage $V_1$ of the upper capacitor (C1) is obtained by subtracting the voltage $V_2$ of the lower capacitor (C2) detected by the voltage detection circuit (19) for detecting a voltage of the lower capacitor, from the voltage $V_0$ of the serially-connected upper and lower capacitors (C1 and C2) that is detected by the voltage detection circuit (18) for detecting a voltage of the upper and lower capacitors. The voltage difference ΔV between the upper and lower capacitors (C1 and C2) is obtained by subtracting the voltage $V_1$ of the upper capacitor (C1) from the voltage $V_2$ of the lower capacitor (C2).

Further, the phase difference detection section (15d) is configured to determine the phase shift of the PAM waveform based on the voltage difference ΔV between the upper and lower capacitors (C1 and C2). Specifically, the phase difference detection section (15d) determines the phase shift of the PAM waveform based on a change of the ΔV during a period in which the PAM waveform is not output and a change of the capacitor voltages is small in one cycle of the input voltage.

Specifically, as shown in FIG. 8, the phase difference detection section (15d) checks how the ΔV varies during periods I and II in which the PAM waveform is not output and the ΔV is approximately flat in one cycle of the input voltage. The ΔV does not vary much, when there is almost no phase shift in the PAM waveform and when the PAM current at an output of the PAM waveform is balanced in a half cycle of the input voltage. On the other hand, the ΔV varies significantly, when there is a large phase shift in the PAM waveform and when the PAM current at an output of the PAM waveform is one-sided in a half cycle of the input voltage. To describe this in more detail using FIG. 8, in the case where the amount of change of the ΔV is positive (in the case where the ΔV increases), the PAM current according to the PAM waveform immediately after a zero-cross point P is larger than the PAM current according to the subsequent PAM waveform, and therefore, the phase of the PAM waveform at that time is delayed with respect to a targeted PAM waveform. On the contrary, in the case where the amount of change of the ΔV is negative (in the case where the ΔV decreases), the PAM current according to the PAM waveform immediately after the zero-cross point P is smaller than the PAM current according to the subsequent PAM waveform, and therefore, the phase of the PAM waveform is advanced with respect to the targeted PAM waveform. The periods I and II in FIG. 8 are the time in which the upper and lower capacitors (C1 and C2) are respectively charged, and correspond to a certain period of time in which the switching element (S) of the present invention is in the OFF state.

Accordingly, how much the PAM waveform is delayed or how much the PAM waveform is advanced from the targeted PAM waveform can be determined by the increase and decrease of the ΔV or the amount of increase and decrease of the ΔV.

Figure 10:
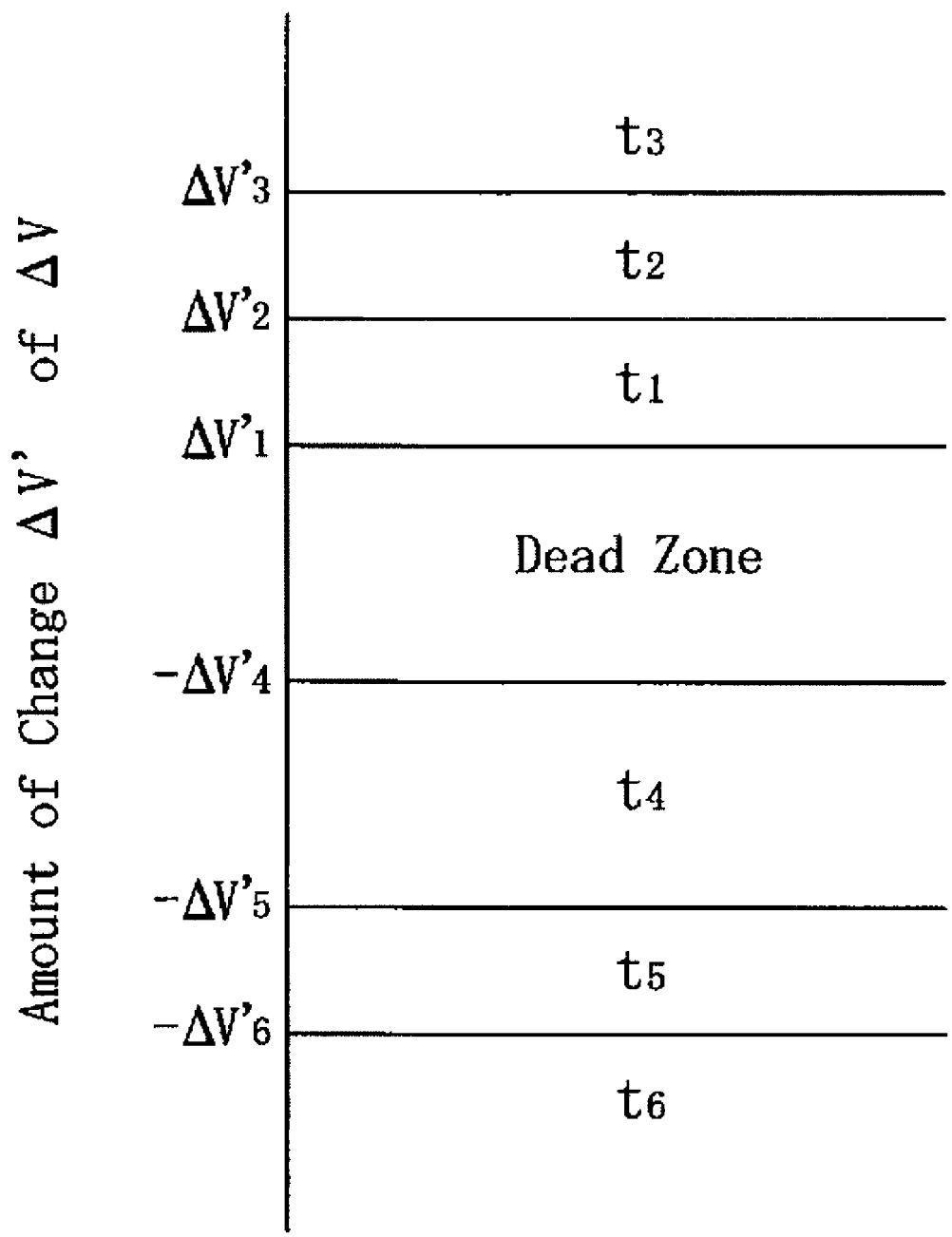
FIG. 10 shows a phase correction amount corresponding to an amount of change in the voltage difference between the upper and lower capacitors.

The phase correction section (15e) is configured to correct a period of time from the zero-cross point P' until the PAM waveform is output, based on the phase shift of the PAM waveform detected by the phase difference detection section (15d). Specifically, as shown in FIG. 10, the phase correction section (15e) corrects the period of time from a trailing edge point of the zero-cross signal, using a phase correction amount for the PAM waveform that is decided according to an amount of change ΔV' of the ΔV. In FIG. 10, values on the upper side of the dead zone, at which no phase correction is made, are correction values for delaying the phase, and values on the lower side of the dead zone are correction values for advancing the phase.

A concrete example of the operation in which the phase shift of the PAM waveform is corrected will be described below using the flowchart shown in FIG. 11.

Figure 11:
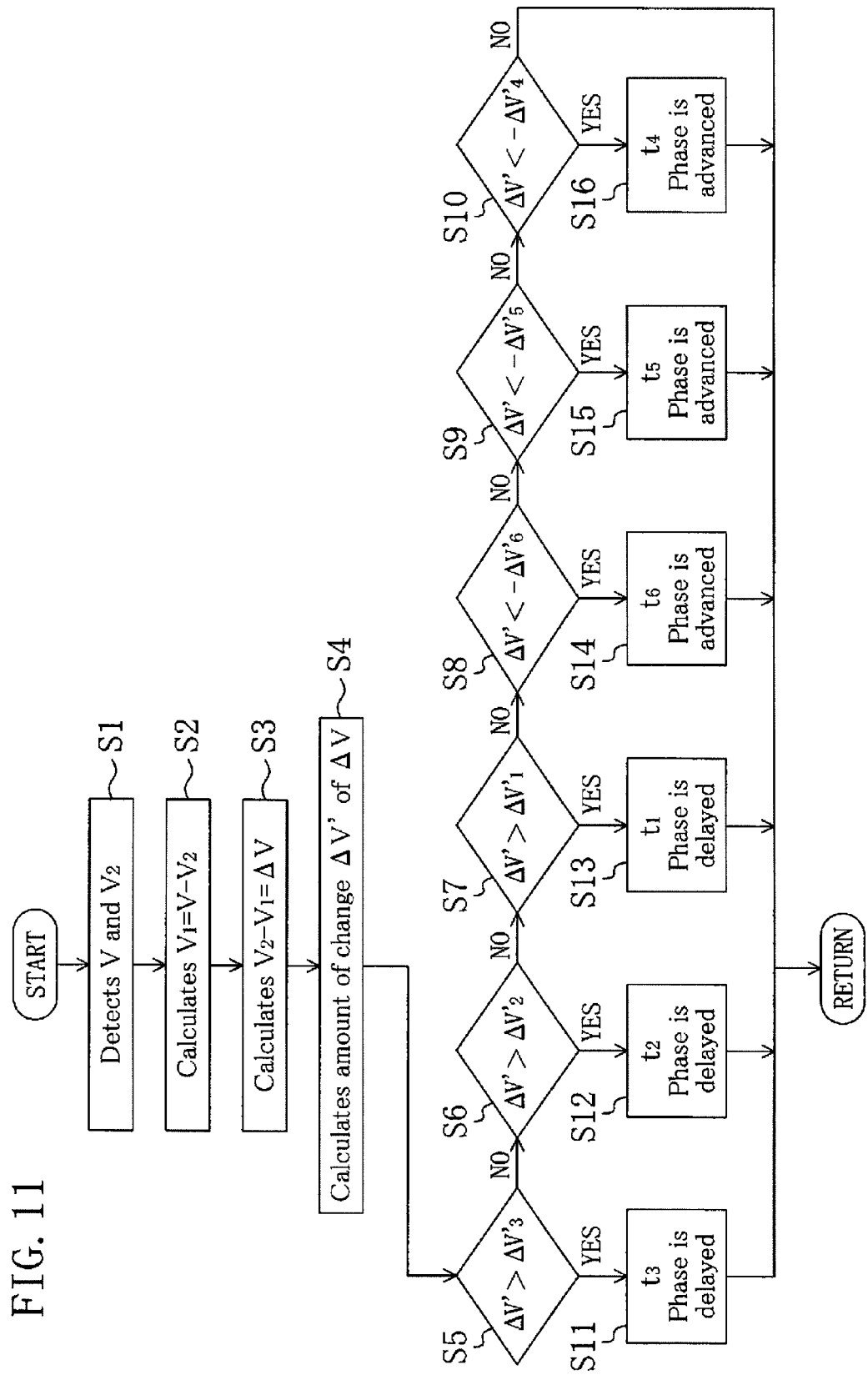
FIG. 11 is a flowchart of phase correction control which is performed according to the amount of change in the voltage difference between the upper and lower capacitors.

When the flow in FIG. 11 starts, first of all, the voltage $V_0$ of the upper and lower capacitors (C1 and C2) and the voltage $V_2$ of the lower capacitor (C2) are detected in step S1. Then, the voltage $V_1$ of the upper capacitor (C1) is obtained from the $V_0$ and $V_2$ (step S2) to calculate the voltage difference ΔV ($=V_2-V_1$) between the upper and lower capacitors (C1 and C2) using the $V_1$ and $V_2$ (step S3).

Then, in step S4, the amount of change ΔV' of the ΔV is obtained. Specifically, a change of ΔV during a period in which the PAM waveform is not output in one cycle of the input voltage is obtained as the ΔV'. Which area in FIG. 10 the obtained ΔV' belongs to is determined in the subsequent steps S5 through S10. Here, the ΔV' is a positive value if the ΔV increases, and is a negative value if the ΔV decreases.

Step S5 first determines whether or not the ΔV' is greater than a $ΔV'_3$, and if the ΔV' is determined to be greater than $ΔV'_3$ (in the case of "YES"), it is necessary to delay the phase of the PAM waveform, and thus, the phase is delayed by $t_3$ from the current phase of the PAM waveform in the subsequent step S11. On the other hand, if the ΔV' is determined to be equal to or smaller than $ΔV'_3$ (in the case of "NO"), the flow proceeds to step S6 to determine whether or not the ΔV' is greater than a $ΔV'_2$. If the ΔV' is determined to be greater than $ΔV'_2$ (in the case of "YES"), the phase is delayed by $t_2$ from the current phase of the PAM waveform in step S12. On the other hand, if the ΔV' is determined to be equal to or smaller than $ΔV'_2$ (in the case of "NO"), the flow proceeds to step S7 to determine whether the ΔV' is greater than a $ΔV'_1$.

If step S7 determines that the ΔV' is greater than $ΔV'_1$ (in the case of "YES"), the phase is delayed by $t_1$ from the current phase of the PAM waveform in step S13, whereas if the ΔV' is determined to be equal to or smaller than $ΔV'_1$ (in the case of "NO"), the flow proceeds to step S8 to determine whether or not the ΔV' is smaller than $ΔV'_6$. If the ΔV' is determined to be smaller than the $-ΔV'_6$ (in the case of "YES"), the flow proceeds to step S14, and the phase is advanced by $t_6$ from the current phase of the PAM waveform, whereas if the ΔV' is determined to be equal to or greater than $-ΔV'_6$ (in the case of "NO"), the flow proceeds to S9.

Step S9 determines whether or not the ΔV' is smaller than $-ΔV'_5$. If the ΔV' is determined to be smaller than the $-ΔV'_5$ (in the case of "YES") in this step S9, the flow proceeds to step S15, and the phase is advanced by $t_5$ from the current phase of the PAM waveform, whereas if the ΔV' is determined to be equal to or greater than the $-ΔV'_5$ (in the case of "NO"), the flow proceeds to step S10 to determine whether or not the ΔV' is smaller than $-ΔV'_4$. If the ΔV' is determined to be smaller than the $-ΔV'_4$ (in the case of "YES"), the flow proceeds to step S16, and the phase is advanced by $t_4$ from the current phase of the PAM waveform, whereas if the ΔV' is determined to be equal to or greater than the $-ΔV'_4$ (in the case of "NO"), the ΔV' is equal to or greater than the $-ΔV'_4$ and equal to or smaller than $ΔV'_1$, which belongs to the dead zone area in FIG. 10, and thus, the flow is terminated here and is returned to START to restart this flow. The flow is terminated and is returned to START to restart the flow, also after the phase correction of the PAM waveform in the above steps S11 through S16.

(ON Control on a Trailing Edge of a Zero-Cross Signal)

Figure 12:
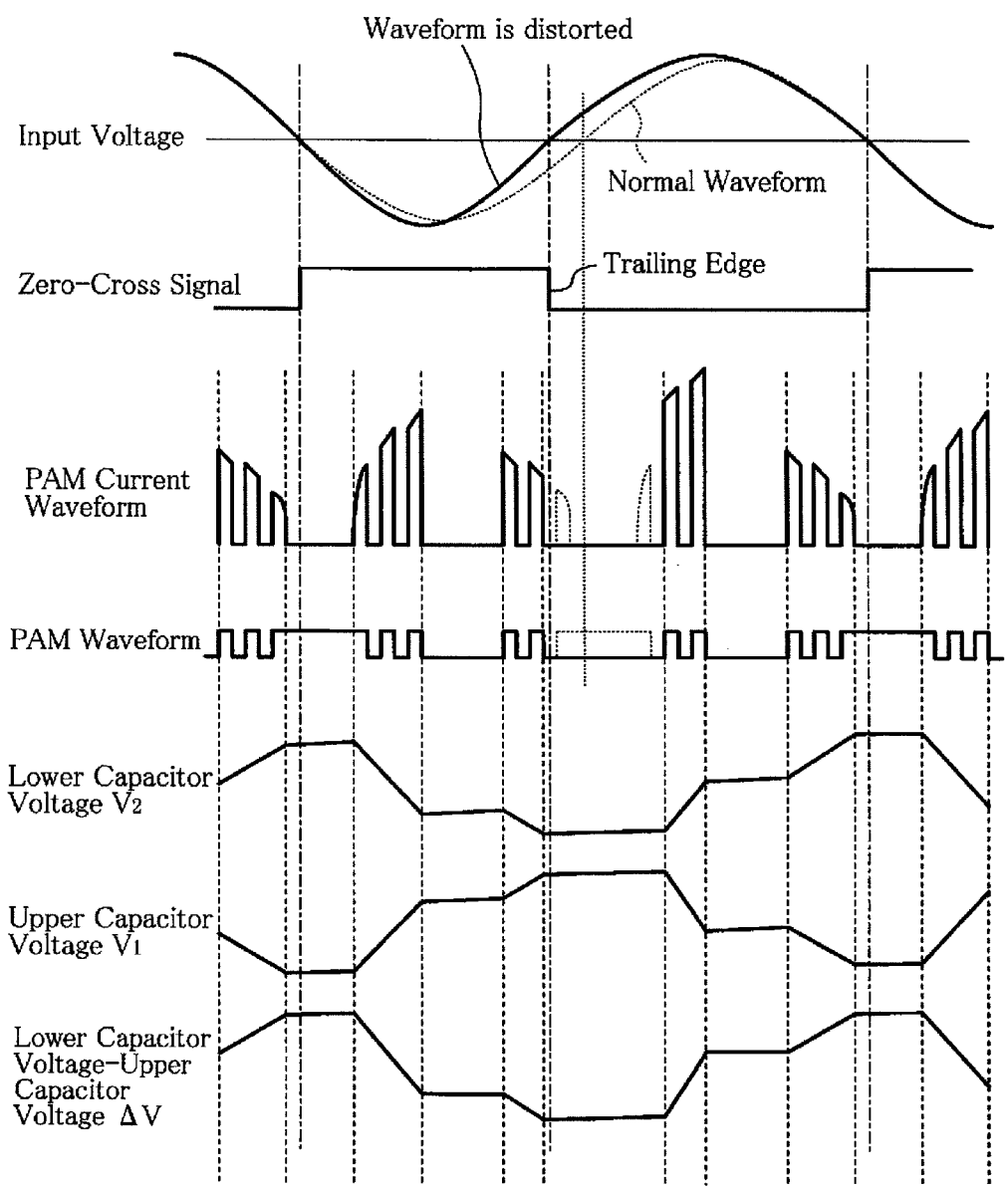
FIG. 12 is a waveform diagram illustrating the relationship between an output state of the PAM waveform and the PAM current, when the waveform of the input voltage is distorted.

Incidentally, according to the electric power supply circuit (10), even if a phase shift of the PAM waveform is detected and a phase correction is made based on the detection result as described in the above, the switching element (S) will not be in the ON state, and therefore the capacitors (C1 and C2) are not charged until a next ON pulse is output from the PAM waveform output section (15b), if the switching element (S) is in the OFF state at the time of detection of a trailing edge of the zero-cross signal in the case where the waveform of the input voltage of the power source (20) is distorted (shown in solid line) and the zero-cross signal is shifted as shown, for example, in FIG. 12. More specifically, if the switching element (S) is in the ON state at the time of detection of a trailing edge of the zero-cross signal and the ON state (shown in broken line) is maintained as shown in FIG. 12, the PAM current as indicated in broken line passes through each of the upper and lower capacitors (C1 and C2), and thereby the capacitors (C1 and C2) are charged. However, if the waveform of the input voltage is distorted as illustrated in solid line and the switching element (S) is in the OFF state at the time of detection of a trailing edge of the zero-cross signal, the OFF state is maintained and the capacitors (C1 and C2) are not charged.

In such a case, the voltage is decreased in a capacitor (the lower capacitor C2 in the example of FIG. 12) that is charged when the switching element (S) is turned into the ON state by the first output of the ON pulse, and when the switching element (S) is turned into the ON state, the capacitor (C2) is charged abruptly and excessively. Thus, the voltage of the capacitor (C2) quickly and temporarily increases to result in an excess voltage, and the operation of the device is stopped by protection control of the microcomputer (15).

Figure 13:
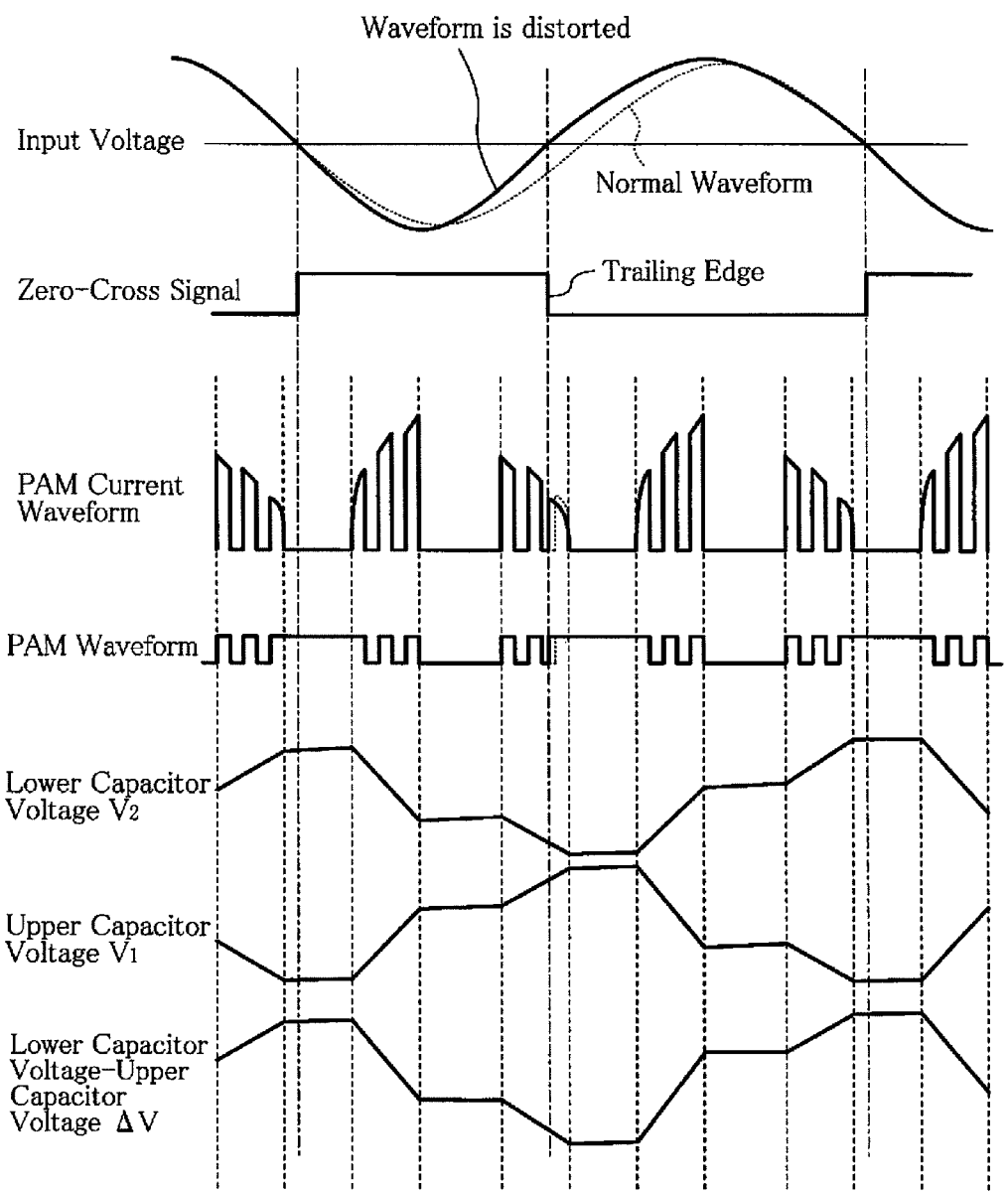
FIG. 13 is a waveform diagram illustrating the relationship between an output state of the PAM waveform and the PAM current, when an ON pulse is output at zero-cross points.

To avoid this problem, according to the present invention, an ON pulse is output from the PAM waveform output section (15b) to the switching element (S) when the zero-cross detection section (15a) detects the trailing edge point of the zero-cross signal, as shown in FIG. 13. Thus, as illustrated in solid line, the switching element (S) is in the ON state until a first OFF pulse is output from the PAM waveform output section (15b). This means that the capacitors (C1 and C2) are charged even during a period of time after the detection of the trailing edge point of the zero-cross signal until the output of the first OFF pulse. By forcibly outputting an ON pulse at detection of a trailing edge point of the zero-cross signal to turn the switching element (S) into the ON state as described in the above, the overcharge because of no time to charge the capacitor (C2) can be prevented although the PAM waveform is shifted from the ideal PAM waveform (broken line) as shown in FIG. 13.

After the switching element (S) is forcibly turned into the ON state at detection of a trailing edge point of the zero-cross signal as described in the above, the ON and OFF pulses are output, as mentioned earlier, based on the a zero-cross point P by the timer section (15c) at a predetermined timing (so that an ON pulse extends over the zero-cross point P), thereby enabling the switching element (S) to always be in the ON state at the zero-cross point P. In the case where the phase of the PAM waveform is shifted, it is only necessary to detect the phase shift of the PAM waveform and perform the phase correction control based on the detection result, as mentioned earlier. In the state of FIG. 13, like the state of FIG. 8, the phase of the PAM waveform is delayed from the targeted PAM waveform, and therefore, correction control for advancing the phase of the PAM waveform is necessary.

Effects of the Embodiment

According to this embodiment, the smoothing circuit (13) which has two capacitors (C1 and C2) serially connected to each other is connected to an output side of the bridge circuit (12) as a rectifier circuit. At the same time, in the voltage doubler circuit which performs double-voltage rectification when the switching element (S) provided between a midpoint between the capacitors (C1 and C2) and the alternating current power source (20) is turned into the ON state, the microcomputer (15) for outputting the PAM waveform to the switching element (S) at a predetermined timing based on a zero-cross point of the input voltage of the bridge circuit (12) includes the phase difference detection section (15d) for detecting a shift in the output phase of the PAM waveform based on a voltage difference between the two capacitors (C1 and C2), and the phase correction section (15e) for correcting the output phase of the PAM waveform. It is thus possible to correct the phase shift of the PAM waveform with high accuracy so that the input voltage of the bridge circuit (12) has a sine waveform.

Specifically, since the amount of charge in the two capacitors (C1 and C2) is varied due to an imbalance of the PAM current that is caused when the phase of the PAM waveform is shifted, the phase shift of the PAM waveform can be precisely detected by checking the voltage difference between the capacitors (C1 and C2).

Accordingly, the phase of the PAM waveform can be corrected to approximate to a targeted phase, and therefore, an increase in a ripple voltage due to the imbalance of the amount of charge between the capacitors (C1 and C2) can be prevented. This eliminates the need to increase the capacities of the capacitors (C1 and C2) and increase the breakdown voltage of the capacitors (C1 and C2) so that the capacitors can withstand the increased ripple voltage. It is therefore possible to achieve compact capacitors (C1 and C2) and reduce costs for capacitors.

Moreover, to correct the phase shift of the PAM waveform as described in the above, the phase shift of the PAM waveform is determined according to the change $\Delta V'$ of the voltage difference $\Delta V$ between the capacitors (C1 and C2) when the PAM waveform is not output and the switching element (S) is in the OFF state in one cycle of the input voltage. This makes it possible to compare voltage differences $\Delta V$ at portions in which there is almost no change in the voltage difference between the capacitors (C1 and C2), and therefore, the phase shift of the PAM waveform can be detected by a simple configuration and calculation.

Moreover, the microcomputer (15) includes the zero-cross detection section (15a) for detecting a trailing edge of the zero-cross signal, and the PAM waveform output section (15b) for outputting an ON pulse at the detection of the trailing edge of the zero-cross signal. This configuration prevents the switching element (S) from being kept in the OFF state with reliability, and as a result, the capacitors (C1 and C2) are prevented from being quickly and excessively charged after a voltage decrease. Therefore, a stop of the operation of the electric power supply circuit (10) due to an excess voltage of the capacitors (C1 and C2) can be prevented. This eliminates the need to increase the capacities of the capacitors (C1 and C2) and to increase the breakdown voltage of the capacitors (C1 and C2) so that the capacitors (C1 and C2) can withstand the occurrence of the excess voltage of the capacitors (C1 and C2), and consequently, compact capacitors (C1 and C2) and cost reduction for capacitors are possible.

Modification of the Embodiment

In the above embodiment, the phase shift of the PAM waveform is determined according to a change in the voltage difference $\Delta V$ between the two capacitors (C1 and C2). However, the method is not limited to this, but the phase shift of the PAM waveform may also be determined according to a change in the voltage of one of the two capacitors (C1 and C2) with time (an incline in FIG. 8 and FIG. 9). The same reference character is given to the same element, and explanation will be given to only the different elements.

Figure 9:
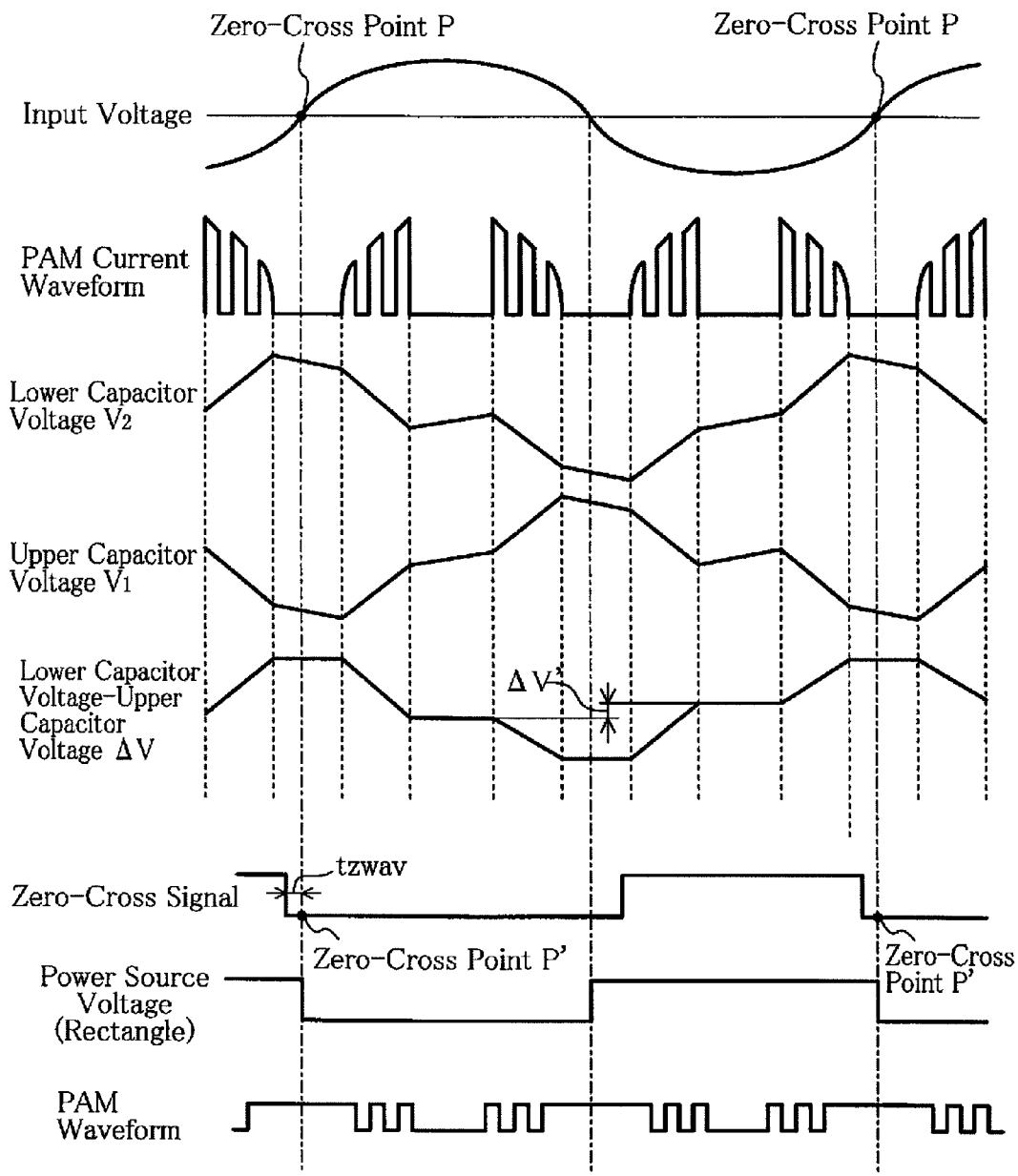
FIG. 9 is a waveform diagram illustrating the relationship between the PAM current and the voltages of the upper and lower capacitors when the phase control is performed.

Specifically, the change in voltage of a capacitor with time is decided by the voltage difference between the voltage of the capacitor and the voltage of the electric power supply. That is, as shown in FIG. 8 and FIG. 9, the amount of change in the voltage is small when the PAM current is small, and the amount of change in the voltage is large when the PAM current is large. Thus, when the change in the voltage of the capacitor with time is significant and the voltage of the capacitor is increasing, the amount of charge in the capacitor increases.

Thus, by detecting at which PAM waveform, which is output twice in a half cycle of the input voltage, the change in the voltage of the capacitor with time is significant, it is possible to detect whether the PAM current is large or small, in other words, possible to detect to which side the phase of the PAM waveform is shifted, as well as possible to detect the amount of phase shift of the PAM waveform.

According to the above configuration, the phase of the PAM waveform can be controlled by detecting the change in the voltage of one of the two capacitors (C1 and C2) without detecting the voltages of the two capacitors (C1 and C2). As a result, a PAM control can be performed with reliability in a simple configuration.

Other Embodiments

The following structures may be used in the above embodiment.

In the above embodiment, a pulse group generated at each zero-cross point consists of five pulses. However, the number of pulses is not limited to five, but may be seven or nine. In addition, the number of pulses in the pulse group is not limited to an odd number, but the number may be an even number.

In the above embodiment, the timer section (5c) starts counting from a trailing edge point of the zero-cross signal, but the present invention is not limited to this structure. For example, a zero-cross point P itself may be detected so that the timer section (5c) can start counting from the zero-cross point P. In this case, an ON pulse is forcibly output by the PAM waveform output section (15b) when the zero-cross point P is detected.

In the above embodiment, the phase shift of the PAM waveform is corrected by the phase correction amount which is defined in several levels according to the change in the voltage difference between the capacitors (C1 and C2) as shown in FIG. 10. However, the present invention is not limited to this structure, and the phase correction amount may be a constant value.

In the above embodiment, a phase correction of the PAM waveform is carried out for the converter circuit (11) which converts a single-phase alternating current to a direct current, but the present invention is not limited to this structure but may be applied to a converter circuit which converts a three-phase alternating current to a direct current.

INDUSTRIAL APPLICABILITY

As explained in the above, according to the present invention, a phase shift of a PAM waveform during PAM control is determined based on the amount of charge of a capacitor, and the phase of the PAM waveform is corrected such that an input current of a rectifier circuit has a sine waveform. Therefore, the present invention is particularly useful for an electric power supply circuit for reducing harmonics of the input current.

The invention claimed is:

1. An electric power supply circuit comprising:
   a rectifier circuit which is connected to an alternating current power source and which rectifies alternating current power;
   a smoothing circuit which has two capacitors serially connected to each other and which is connected to an output side of the rectifier circuit;
   a switching element which, when turned into an ON state, connects the alternating current power source and a midpoint between the two capacitors and which causes a short circuit of an output power of the rectifier circuit; and
   a PAM control section which outputs a pulse signal for switching the switching element, at a predetermined timing based on a zero-cross point of an input voltage of the rectifier circuit, wherein
   the PAM control section includes:
   a phase difference detection section which detects, based on an amount of charge in the two capacitors, a shift between an output phase of the pulse signal and a phase of a pulse signal that makes an input current of the rectifier circuit have a sine waveform; and
   a phase correction section which shifts the output phase of the pulse signal in a lead direction or a lag direction so that the phase shift detected by the phase difference detection section is removed.

2. The electric power supply circuit of claim 1, wherein the phase difference detection section is configured to detect the shift between the output phase of the pulse signal and the phase of the pulse signal that makes the input current of the rectifier circuit have a sine waveform, based on a voltage difference between the two capacitors.

3. The electric power supply circuit of claim 2, wherein the phase difference detection section is configured to detect the shift between the output phase of the pulse signal and the phase of the pulse signal that makes the input current of the rectifier circuit have a sine waveform, based on a change in the voltage difference between the two capacitors, the change in the voltage difference between the two capacitors being obtained by comparing voltage differences during periods in which the switching element is in an OFF state for more than a certain period of time in one cycle of the input voltage.

4. The electric power supply circuit of claim 1, wherein the phase difference detection section is configured to detect the shift between the output phase of the pulse signal and the phase of the pulse signal that makes the input current of the rectifier circuit have a sine waveform, based on a voltage change of one of the two capacitors.

5. The electric power supply circuit of claim 1, wherein the phase correction section is configured to correct the output phase of the pulse signal in stages according to the amount of charge in the two capacitors.

6. The electric power supply circuit of claim 1, wherein the PAM control section further includes:
   a zero-cross detection section which detects that the input voltage of the rectifier circuit has increased to be equal to or higher than a predetermined value and is approaching the zero-cross point; and
   a PAM waveform output section which outputs an ON pulse to the switching element when the zero-cross detection section detects that the input voltage of the rectifier circuit has increased to be equal to or higher than a predetermined value and is approaching the zero-cross point.

7. A PAM control method for an electric power supply circuit comprising:
   a rectifier circuit which is connected to an alternating current power source and which rectifies alternating current power;
   a smoothing circuit which is connected to an output side of the rectifier circuit and which has two capacitors serially connected to each other,
   a switching element which, when turned into an ON state, connects the alternating current power source and a midpoint between the two capacitors and which causes a short circuit of an output power of the rectifier circuit; and
   a PAM control section which outputs a pulse signal for switching the switching element at a predetermined timing based on a zero-cross point of an input voltage of the rectifier circuit, wherein
   the PAM control section detects a voltage difference between the two capacitors, and shifts an output phase of the pulse signal in a lead direction or a lag direction in stages according to the voltage difference between the two capacitors so that the output phase of the pulse signal is a predetermined phase that makes an input current of the rectifier circuit have a sine waveform.

* * * * *